June 7, 1955 W. E. PFEFFER 2,710,377
ELECTRICAL MEASURING INSTRUMENTS
Filed Nov. 16, 1951 2 Sheets-Sheet 1
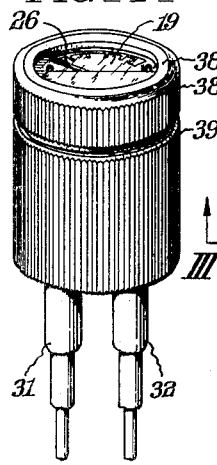
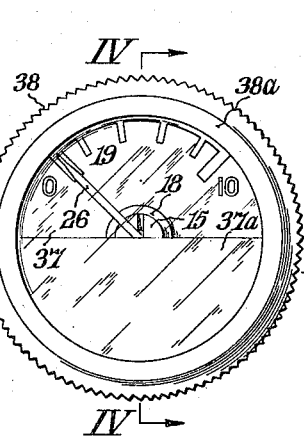
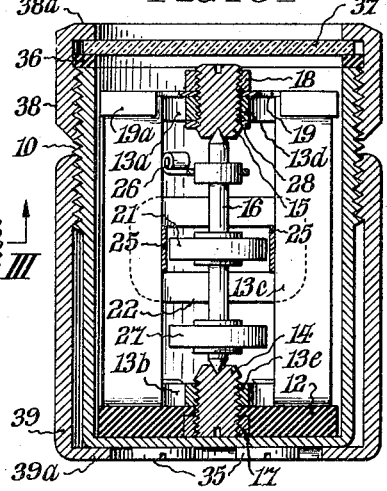
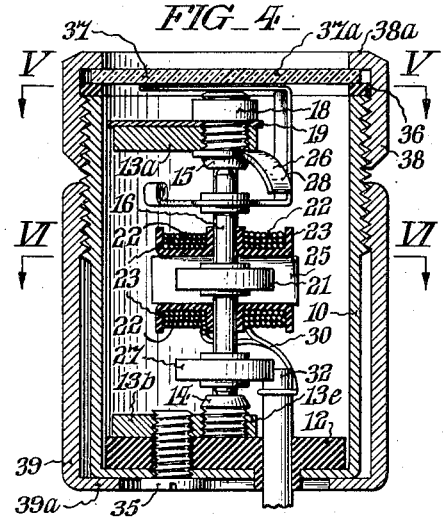
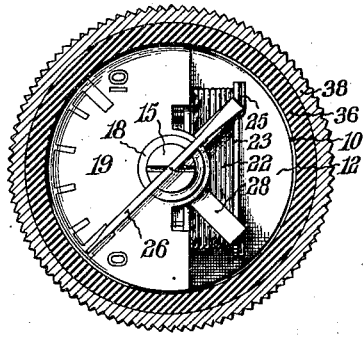
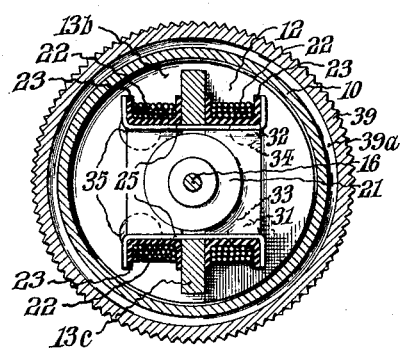
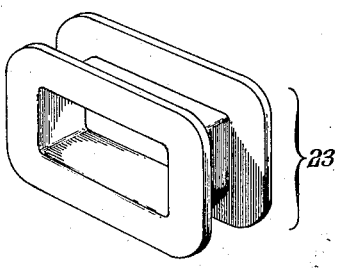
INVENTOR:
William E. Pfeffer,
BY Paul & Paul
ATTORNEYS.

June 7, 1955     W. E. PFEFFER     2,710,377
ELECTRICAL MEASURING INSTRUMENTS
Filed Nov. 16, 1951     2 Sheets-Sheet 2
FIG_7_
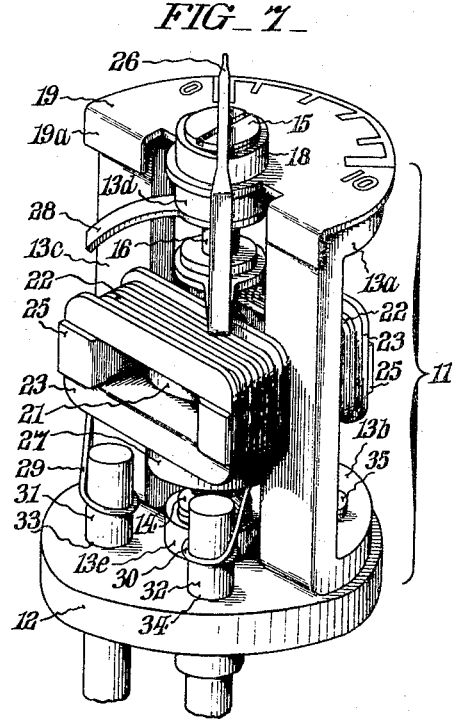
FIG_8_
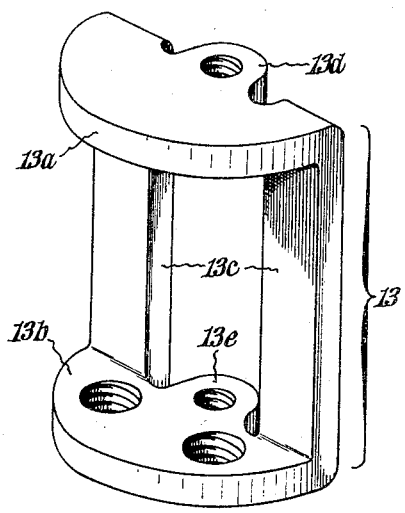
INVENTOR:
William E. Pfeffer,
BY Paul & Paul
ATTORNEYS.

United States Patent Office

2,710,377
Patented June 7, 1955

---

2,710,377

ELECTRICAL MEASURING INSTRUMENTS

William E. Pfeffer, Perkasie, Pa., assignor to Paul Mood, Lester Void, and William E. Pfeffer, copartners, trading under the name of The Electro-Mechanical Instrument Company, Perkasie, Pa.

Application November 16, 1951, Serial No. 256,738

7 Claims. (Cl. 324—146)

This invention relates to electric measuring instruments such as volt meters, ammeters and the like. More specifically it is concerned with instruments for measuring small currents in milli-volts or amperes.

The chief aim of my invention is to provide an instrument, of the kind particularly referred to, which is compact and of miniature size; of which the component parts are so constructed as to be easily and quickly assembled; which, notwithstanding its being of delicate construction, can be relied upon for accuracy of its readings and for sturdiness against injury or easy disarrangement; and which moreover is immune against the influence of external magnetism.

Other objects and attendant advantages will appear from the following description of the attached drawings, wherein:

Fig. 1 is a perspective view of my improved electric measuring instrument, twice enlarged.

Fig. 2 shows the top plan of the instrument four times enlarged.

Figs. 3 and 4 are axial sections taken as indicated respectively by the angled arrows III—III and IV—IV in Fig. 2.

Figs. 5 and 6 are horizontal sections taken as indicated respectively by the arrows V—V and VI—VI in Fig. 4.

Fig. 7 is a perspective view of an assemblage in which all of the working parts of the instrument are embodied, and which is removable as a unit from the casing of the instrument.

Figs. 8 and 9 are perspective views of certain parts of the assemblage illustrated in Fig. 7.

As herein shown, my improved meter comprises an elongate cup-section cylindric casing component 10 which is fashioned in practice from steel or other magnetic metal or material. Engaging with a snug fit into casing component 10 is the unit separately illustrated in Fig. 7 and comprehensively designated by the numeral 11. From Figs. 3 and 4 it will be noted that the unit 11 includes a basal insulation disk 12 of rubber or of fiber composition, which has a snug fit within casing component 10 and whereupon is mounted, in fixed relation, an open frame 13 (Fig. 8) of brass or other non-magnetic metal or material, with forwardly-projecting semi-circular upper and lower discous portions 13a and 13b integrally connected by spaced diametral verticals 13c, said semi-circular portions respectively having pierced axial ears 13d and 13e.

Passing up through a shouldered central aperture in insulation disk 12 and threadedly engaging a tapped bore in the lower ear 13e of frame 13 is a screw 14; and similarly engaged in a tapped bore in the upper ear 13d of said frame is a screw 15. These screws 14 and 15 serve as adjustable socket bearings for the coned ends of an arbor 16, and are securable in adjusted positions by the clamp nuts indicated at 17 and 18. Overlying the semi-circular top portion 13a of frame 13 is a similarly shaped graduated dial 19 held in place by clamp nut 18 and prevented from shifting about screw 17 by downturned lugs 19a thereon which lap the verticals 13c of said frame as best shown in Fig. 7.

Affixed at about the midpoint of arbor 16 is a permanent magnet 21 of discous configuration which projects part way into the hollows of transversely-arranged coils 22 so as to react with the flux of said coils when the current to be measured passes through the latter. The wires of coils 22 are wound about rectangular core spools 23, see Fig. 9, of insulation which are held in place medially of the height of the frame verticals 13c, at the back, by straps 25 of brass soldered or otherwise made fast to said verticals, as best shown in Fig. 6. Fast on arbor 16 at an elevation above the coil 22s is a pointer 26 which is bent upwardly and forwardly to overreach dial 19, see Fig. 4; and secured to said arbor below said coils is a second permanently-magnetized disk 27. The pointer 26 is normally maintained in zero position over dial 19 by a restoring magnet in the form of a finger 28 radial to the arbor axis and soldered or otherwise permanently attached to the upper portion 13a of frame 13.

The leads 29 and 30 from the coils 22 are soldered to terminal studs 31 and 32 which are lodged in insulation disk 12 and which pass down through clearance holes 33 and 34 in the bottom of casing component 10. Unit 11 is secured within casing component 10 by headed screws 35 whereof the shanks extend through insulation disk 12 and take into the portion 13b of frame 13.

Overlying the open top end of casing component 10 with interposition of a gasket 36, is a window 37 which may be of glass or plastic and which is circumferentially overlapped by the inward horizontal peripheral flange 38a of a centrally-open removable cap 38 threadedly engaged with the top end of said casing component. As conventionally indicated by the heavy sectional lines in Figs. 2 and 4, the lower half 37a of window 37 is made opaque to hide the underlying working parts of the instrument. The remaining portion of casing component 10 is enveloped by a screw-engaging shell 39 whereof the inwardly projecting circumferentially flange 39a underreaches the bottom of said component. It is to be understood that cap 38 and shell 39 are both of steel to serve, jointly with casing component 10, as a shield for protection of the instrument from external magnetic influence.

Having thus described my invention, I claim:

1. In an electric measuring instrument, a cylindric cup-like casing component of magnetic material; a removable insert unit having a snug fit within the casing component, said unit comprising an integrally-formed open frame of non-magnetic material with laterally-spaced uprights and semi-circular portions extending forwardly frrom the upper and lower ends of the uprights, a pair of transversely-arranged hollow coils fixedly supported medially of the height of the frame uprights at opposite sides of the latter, socketed bearing screws respectively adjustably engaged in threaded apertures axially of the semi-circular portions of the frame, an arbor with it ends engaged in the sockets of the bearing screws, a permanent magnet on the arbor projecting part way into the hollows of the coil, a graduated dial on the upper semi-circular portion of the frame, a coordinating pointer on the arbor above the coil bent upwardly and forwardly about the upper semi-circular portion of the frame to overreach the dial, and a circular disk of insulation affixed in axial relation to the bottom of the lower semi-circular portion of the frame; means at the bottom of the casing component for securing the unit in place; and a cap with a window removably engaged with the casing component at the top.

2. An electric measuring instrument according to claim 1, wherein the cap is of magnetic material; and further including a removable sleeve also of magnetic material and of the same diameter as the cap surrounding the remaining portion of the casing component and serving with the cap and the casing component as a shield to protect the instrument from external magnetic influence.

3. An electric measuring instrument according to claim 1, wherein the cap is of magnetic material and screw engaged with the casing component, and further including a sleeve also of magnetic material and of the same diameter as the cap and likewise screw engaged with the casing component to surround the remaining portion of the latter and thereby to serve with the cap and the casing component as a shield for protection of the instrument from external magnetic influence.

4. An electric measuring instrument according to claim 1, further including terminal studs whereto the leads of the coils are connected, said studs being anchored in the insulation disk and extending through clearance apertures in the bottom of the casing component.

5. An electric measuring instrument according to claim 1, wherein the insert unit further includes a permament restoring magnet in the form of a finger extending radially relative to the arbor and attached to the upper semi-circular portion of the frame.

6. In an electric measuring instrument, a cylindric cup-like casing of magnetic material; a removable insert unit comprising an open frame of non-magnetic material with vertically-spaced discoid portions shaped to conform with the interior of the casing and connected by a pair of diametrally-arranged uprights, a pair of transversely-arranged coils fixedly supported respectively medially of the height of the uprights, an arbor with its ends rotatively borne in the discous portions of the frame in the axis of the casing and between the coils, a permanent magnet on the arbor at the level of the two coils; a graduated dial on the upper discous portion of the frame, a coordinating pointer on the arbor above the coils bent upwardly and forwardly about the upper discous portion of the frame to overreach the dial, and a disk of insulation secured to the bottom of the lower discous portion of the frame; means at the bottom of the casing for securing the unit in place; and a cap with a window removably engaged over and closing the casing at the top.

7. An electric measuring instrument according to claim 6, further including terminal studs whereto the leads of the magnet coils are connected, said studs being anchored in the insulation disk and extending through clearance apertures in the bottom of the casing.

References Cited in the file of this patent

UNITED STATES PATENTS

| 1,706,537 | Mercier | Mar. 26, 1929 |
| 1,754,085 | Faus | Apr. 8, 1930 |
| 2,463,844 | Anderson | Mar. 8, 1949 |
| 2,500,628 | Clark | Mar. 14, 1950 |
| 2,517,171 | Bernreuter | Aug. 1, 1950 |

FOREIGN PATENTS

| 938,314 | France | Mar. 30, 1948 |